US008940060B2

(12) United States Patent
Baird et al.

(10) Patent No.: US 8,940,060 B2
(45) Date of Patent: Jan. 27, 2015

(54) METHODS AND APPARATUSES FOR FORMING LOW-METAL BIOMASS-DERIVED PYROLYSIS OIL

(75) Inventors: Lance Awender Baird, Prospect Heights, IL (US); Stefan Muller, North Vancouver, CA (US); Barry A. Freel, Greely, CA (US)

(73) Assignee: UOP LLC, Des Plaines, IL (US)

( * ) Notice: Subject to any disclaimer, the term of this patent is extended or adjusted under 35 U.S.C. 154(b) by 421 days.

(21) Appl. No.: 13/327,525

(22) Filed: Dec. 15, 2011

(65) Prior Publication Data

US 2013/0152455 A1 Jun. 20, 2013

(51) Int. Cl.
*C10L 1/00* (2006.01)

(52) U.S. Cl.
USPC .............................. 44/307; 585/240; 585/242

(58) Field of Classification Search
USPC ..................................... 44/307; 585/240, 242
See application file for complete search history.

(56) References Cited

U.S. PATENT DOCUMENTS

| 4,898,827 | A | 2/1990 | Brierley et al. |
| 5,676,727 | A | 10/1997 | Radlein et al. |
| 5,792,340 | A | 8/1998 | Freel et al. |
| 5,961,786 | A | 10/1999 | Freel et al. |
| 2010/0112242 | A1 | 5/2010 | Medoff |
| 2011/0023565 | A1 | 2/2011 | Yanik et al. |
| 2011/0094147 | A1* | 4/2011 | Bartek et al. .................. 44/282 |
| 2011/0146141 | A1 | 6/2011 | Frey et al. |
| 2011/0146145 | A1 | 6/2011 | Brandvold et al. |

OTHER PUBLICATIONS

Kasparbauer, Randall, The effects of biomass pretreatments on the products of fast pyrolysis, 2009, Iowa State University, pp. xi, xii, 42,129.*

Song, Q., et al, "Effective phase separation of biomass pyrolysis oils by adding aqueous salt solutions," Energy and Fuels, vol. 23, No. 6, p. 3307-3312: Jun. 18, 2009.

Steenari, B., et al, "Addition of kaolin as potassium sorbent in the combustion of wood fuel—Effects on fly ash properties," Fuel, vol. 89, No. 8, p. 2029-2032; Aug. 2010.

* cited by examiner

*Primary Examiner* — Cephia D Toomer

(57) ABSTRACT

Methods and apparatuses for forming a low-metal biomass-derived pyrolysis oil are provided. In an embodiment, a method for forming a low-metal biomass-derived pyrolysis oil includes washing biomass comprising a water-soluble metal component therein with wash water that is substantially free of water-soluble metals. The washed biomass and water containing water-soluble metal are separated after washing the biomass. The washed biomass is pyrolyzed in a pyrolysis process to form a pyrolysis vapor stream. A portion of the pyrolysis vapor stream is condensed to form a condensate. The wash water is derived from the washed biomass. In an embodiment of an apparatus, the apparatus comprises a washing stage, a biomass dryer, a pyrolysis reactor, a quenching system comprising a primary condenser and a secondary condenser, and a return line that connects the quenching system to the washing stage.

21 Claims, 2 Drawing Sheets

METHODS AND APPARATUSES FOR FORMING LOW-METAL BIOMASS-DERIVED PYROLYSIS OIL

TECHNICAL FIELD

The present invention generally relates to methods and apparatuses for forming low-metal biomass-derived pyrolysis oil, and more particularly relates to methods and apparatuses for washing biomass prior to pyrolyzing to remove water-soluble metal therefrom.

BACKGROUND

With the growth of world energy demand, alternative energy sources for satisfying such demand have prompted widespread research and development. One such promising alternative energy source is biofuel, which encompasses various types of combustible fuels that are derived from organic biomass. There is a strong desire to develop biofuels that are cost-competitive with fossil fuels due to both environmental benefits as well as the renewable nature of biofuels. One particular type of biofuel is biomass-derived pyrolysis oil. Biomass-derived pyrolysis oil can be burned directly as fuel for certain boiler and furnace applications. Biomass-derived pyrolysis oil can also serve as a potential feedstock in catalytic processes for the production of fuel in petroleum refineries. Biomass-derived pyrolysis oil has the potential to replace up to 60% of transportation fuels, thereby reducing the dependency on conventional fossil fuel and reducing its environmental impact.

Biomass-derived pyrolysis oil is produced through pyrolysis, including through recently-developed fast pyrolysis processes. Fast pyrolysis is a process during which organic biomass, such as wood waste, agricultural waste, etc., are rapidly heated to about 450° C. to about 600° C. in the absence of air using a pyrolysis reactor. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a quenching system to biomass-derived pyrolysis oil. The quenching system contains a primary condenser and, in some instances, a secondary condenser. When the primary and secondary condensers are used, the majority of the biomass-derived pyrolysis oil is yielded in the primary condenser and a minor amount of biomass-derived pyrolysis oil is yielded in the secondary condenser. Biomass-derived pyrolysis oil is a complex, highly oxygenated organic liquid typically containing about 20-30% by weight water with high acidity (TAN>150).

One factor that affects the yield of biomass-derived pyrolysis oil is the amount of ash that is present in the biomass, with high ash content in the biomass reducing the yield of biomass-derived pyrolysis oil. The ash is the solid portion of the biomass that remains after a sample of the biomass is combusted according to ASTM D482. The ash content of the biomass is dependent upon the amount of metals that are present in the biomass. For various types of biomass, such as food crops, fertilizers are used that contain metals such as potassium to promote fruit yield. Because certain food crops yield significant amounts of expended biomass (such as expended fruit bunches), the expended biomass may provide a commercially significant source of biomass-derived pyrolysis oil. However, while the fertilizers used on the food crops are desirable for promoting fruit yield, the metals from the fertilizers are incorporated into the biomass that is subject to pyrolysis and result in reduced yields as compared to crops that are not treated with fertilizers.

To increase liquid yield and reduce the ash content of the biomass, simple washing steps have been employed using water to remove water-soluble metals from the biomass. However, water can be scarce in various locations at which pyrolysis is conducted.

Accordingly, it is desirable to provide methods for forming a low-metal biomass-derived pyrolysis oil, as well as apparatuses for forming the low-metal biomass-derived pyrolysis oil, that minimize the need to secure an independent source of water. Furthermore, other desirable features and characteristics of the present invention will become apparent from the subsequent detailed description of the invention and the appended claims, taken in conjunction with the accompanying drawings and this background of the invention.

BRIEF SUMMARY

Methods of forming a low-metal biomass-derived pyrolysis oil and apparatuses for forming the low-metal biomass-derived pyrolysis oil are provided. In an embodiment, a method of forming a low-metal biomass-derived pyrolysis oil includes the step of washing biomass comprising a water-soluble metal component therein with wash water that is substantially free of water-soluble metals. The washed biomass and water containing water-soluble metal are separated after washing the biomass. The washed biomass is pyrolyzed in a pyrolysis process to form a pyrolysis vapor stream. A portion of the pyrolysis vapor stream is condensed to form a condensate. The wash water is derived from the washed biomass.

In another embodiment of a method of forming a low-metal biomass-derived pyrolysis oil, the method includes the step of washing lignocellulosic biomass with wash water that is substantially free of water-soluble metals. The lignocellulosic biomass has a water-soluble metal component present in an amount of at least about 0.7 weight % based on the total raw weight of the biomass. The washed lignocellulosic biomass and water containing water-soluble metal are separated after washing the biomass. The washed lignocellulosic biomass is pyrolyzed in a pyrolysis process to form a pyrolysis vapor stream. A portion of the pyrolysis vapor stream is condensed in a quenching system comprising a primary condenser and a secondary condenser. The secondary condenser yields a water-rich condensate having a water concentration of at least 30 weight %, based upon the total weight of the secondary condensate. The wash water is derived from the water-rich condensate of the pyrolysis vapor stream.

In an embodiment of an apparatus for forming a low-metal biomass-derived pyrolysis oil, the apparatus comprises a washing stage for mixing biomass that comprises a water-soluble metal component therein with wash water that is substantially free of water-soluble metals. The apparatus further comprises a biomass dryer for separating the washed biomass and water that contains water-soluble metal after washing the biomass. The apparatus further comprises a pyrolysis reactor for pyrolyzing the biomass in the relative absence of molecular oxygen to form a pyrolysis vapor stream. The apparatus further comprises a quenching system comprising a primary condenser and a secondary condenser for condensing a portion of the pyrolysis vapor stream to form a condensate. A return line connects the quenching system to the washing stage for providing water derived from the condensate as the wash water.

BRIEF DESCRIPTION OF THE DRAWINGS

The present invention will hereinafter be described in conjunction with the following drawing figures, wherein like numerals denote like elements.

DETAILED DESCRIPTION

Figure 1:
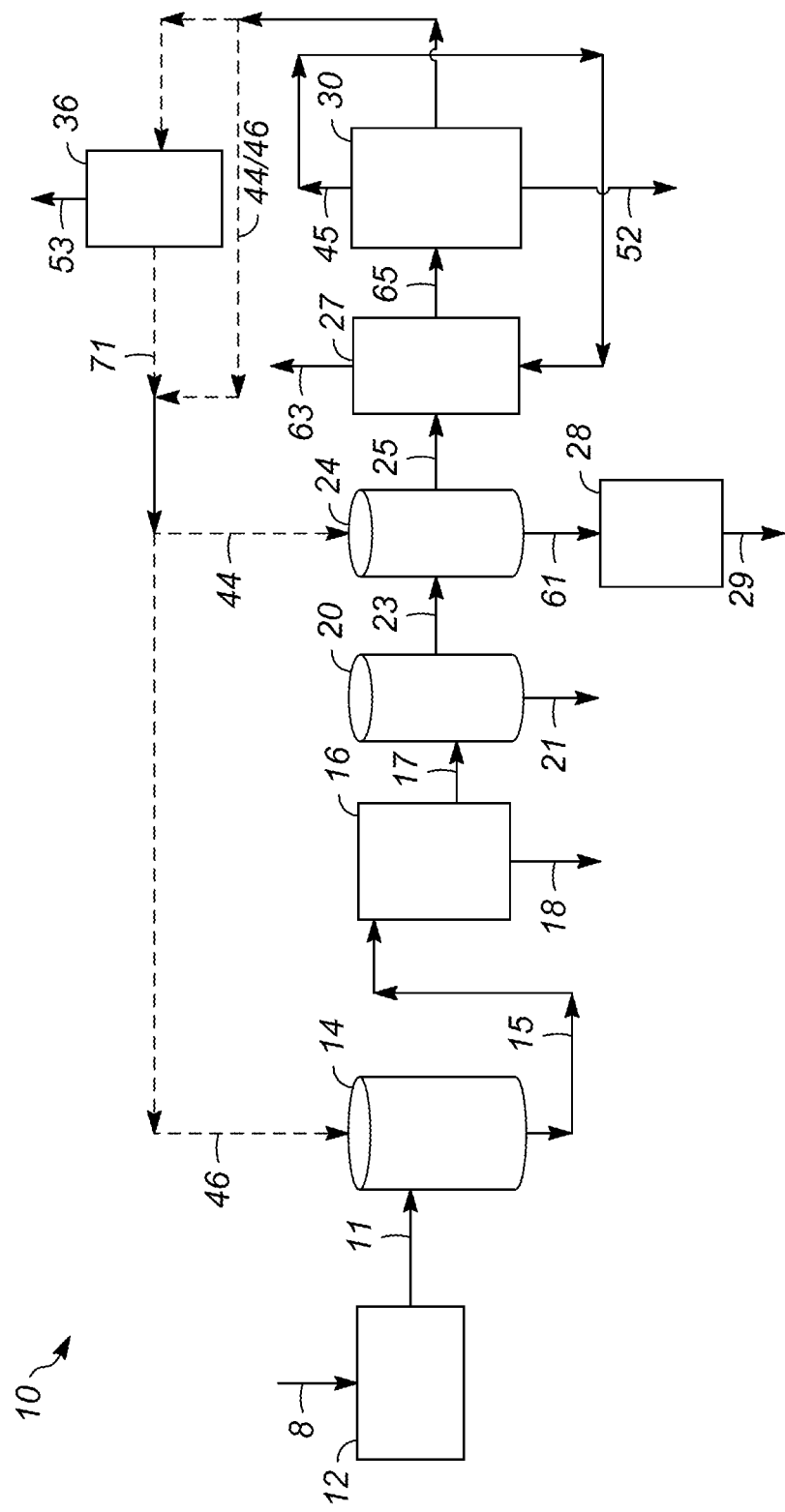
FIG. 1 is a block diagram of an exemplary embodiment of an apparatus for forming a low-metal biomass-derived pyrolysis oil.

The following detailed description is merely exemplary in nature and is not intended to limit the invention or the application and uses of the invention. Furthermore, there is no intention to be bound by any theory presented in the preceding background or the following detailed description.

Methods and apparatuses for forming low-metal biomass-derived pyrolysis oil are provided herein. The methods and apparatuses described herein may be particularly useful under circumstances in which sources of clean, fresh water may be scarce. In particular, the methods and apparatuses derive wash water from washed biomass, with the wash water used for washing the biomass that comprises a water-soluble metal component therein. In one embodiment, the wash water is derived from condensate of a portion of a pyrolysis vapor stream. In this regard, the wash water is still derived from the washed biomass, albeit after pyrolysis of the washed biomass. In another embodiment, the wash water is derived from separation of water from the washed biomass. For example, the washed biomass and water contained therein may be mechanically separated (e.g., through pressing) and/or thermally separated (e.g., through drying), with the separated water optionally purified prior to later use as wash water for washing the biomass.

While the wash water is derived from the washed biomass, it is to be appreciated that the wash water can also include water from other sources so long as at least a portion of the wash water is derived from the washed biomass. For example, the wash water may include fresh water from external sources in addition to water that is derived from the washed biomass. The wash water may also comprise an acid, such as hydrofluoric acid, to aid in the removal of water-soluble metal from the biomass. However, with at least some of the wash water derived from the washed biomass, water can be effectively recycled and conserved while still enabling water-soluble metals to be removed from the biomass to maximize the yield of pyrolysis oil. At least in the embodiment in which the wash water is derived from the condensate of the pyrolysis vapor stream, the need to dry the biomass prior to pyrolysis is minimized because much of the water in the washed biomass can be recovered after pyrolysis in a separate water-rich phase, as described in further detail below, thus possibly minimizing energy requirements associated with traditional energy-hungry drying steps.

The methods and apparatuses described herein are not particularly limited to use of any particular type of biomass beyond those having a water-soluble metal component. Virtually any form of biomass can be considered for pyrolysis to produce biomass-derived pyrolysis oil. The biomass can be any composition that contains plant material, whether raw, digested, or partially separated. For example, the biomass may include, but is not limited to, wood, agricultural wastes/residues, nuts and seeds, algae, grasses, forestry residues, cellulose and lignin or the like. However, the methods and apparatuses are particularly useful for forming low-metal biomass-derived pyrolysis oil from lignocellulosic biomass that has a relatively high content of water-soluble metals, such as expended fruit bunches (e.g., from oil palm fruit) or other biomass that has been subject to treatment with fertilizers, because metal content of pyrolysis oil formed from such biomasses can benefit from washing as described herein. In an embodiment, the biomass is further defined as a lignocellulosic biomass having a water-soluble metal component present in an amount of at least about 0.7 weight %, such as from about 0.7 to about 28 weight %, from about 1 to about 10 weight %, or from about 1 to about 2 weight %, based on the total raw weight of the biomass, i.e., based on the natural weight of the biomass prior to processing. For purposes of the instant application, the amount of water-soluble metal component present in the biomass is determined by combusting a sample of the biomass in accordance with ASTM D482 to obtain ash, washing the ash with water at ambient temperature, determining the weight difference between ash prior to and after washing, and dividing the weight difference by the original weight of the sample.

The biomass is washed with the wash water that is substantially free of water-soluble metals and that is derived from the washed biomass. In this regard, at least a portion of the wash water is recycled from earlier washing of other biomass. Water-soluble metals, as described herein, include metals or salts thereof that have a solubility in water of greater than or equal to about 1000 ppm at a temperature of about 21° C. In an embodiment, the water contains soluble metals in amount of less than or equal to about 500 ppm.

In an embodiment, the biomass is washed during digestion. This embodiment is applicable when the biomass includes a fruit component from which oil can be extracted, such as palm oil, prior to pyrolysis. In this embodiment, as illustrated in the context of flow through the apparatus 10 shown in FIG. 1, raw biomass 8 including the fruit component is introduced into a milling process, where the raw biomass 8 can be stripped in a stripper 12 to separate the fruit component from bunch stalks. After stripping in the stripper 12, the fruit component 11 is moved into a digester 14 where pericarp is loosened therefrom. The digester 14 may include a steam heated vessel (not shown), and the steam used for digestion may be formed from a wash water 46 that serves dual purposes of digesting and removing water-soluble metals from the fruit component. The source of wash water 46 is discussed in more detail below. After digestion in the digester 14, the digested fruit component 15 is passed into a presser 16 and undergoes pressing to separate oil and water from a press cake 17 (which includes fiber and nuts). Pressing can involve a single or multiple pressing steps to maximize extraction of oil and water in a fruit oil stream 18, which then may be subjected to oil processing. The water that is separated from the press cake 17 also carries with it water-soluble metals, thereby effectively washing the press cake 17 which is used for forming pyrolysis oil in later steps. In effect, the press cake 17 remaining after pressing can be referred to as washed biomass for purposes of this embodiment. Washed biomass, for purposes of the instant application, refers to any biomass that has been subject to washing with the wash water.

The press cake 17 including the fiber and the nuts may be subject to a nut separation step, such as through depericating, to separate the nuts from the fiber. The nuts may have independent commercial value and may be used for purposes other than production of pyrolysis oil. However, nuts from some fruits may have no independent commercial value and may remain with the fiber for further processing into pyrolysis oil. In an embodiment in which the nut separation step is performed, as shown in FIG. 1, the press cake 17 is fed to a depericarper 20, which generally includes a vertical column, where air is channeled to lift the fiber and separate the fiber from the nuts. The separated nuts are removed from the depericarper 20 in a nut stream 21 subject to further processing, while the separated fiber 23 is used for forming pyrolysis oil in later steps.

In another embodiment, the fiber 23 is washed with wash water 44 derived from the washed biomass 25, as discussed in more detail below, after digestion and after the optional nut removal step. It is to be appreciated that this embodiment is applicable to circumstances in which the raw biomass 8 includes the fruit component 11. In this embodiment, digestion may be performed using the wash water 46 that is derived from the washed biomass 25, or may be performed using water from a different source. In any event, in this embodiment, wash water 44 that is derived from the washed biomass 25 is used to wash the biomass (i.e., the fiber 23) to remove water-soluble metals therefrom. For purposes of the instant application, the wash water 44/46 may include water from other sources (such as fresh water) so long as at least some of the wash water 44/46 is derived from the washed biomass 25. As shown in FIG. 1, washing may occur in a mixer 24 that thoroughly mixes the wash water 44 and the fiber 23. Washing, after digestion and after the optional nut removal step, may be desirable due to the comminuted nature of the fiber 23, which may enable higher amounts of water-soluble metals to be removed from the fiber 23 as compared to a washing step that occurs during digestion. In accordance with an embodiment of an apparatus 10 described herein that includes a washing stage for mixing biomass comprising a water-soluble metal component therein with wash water that is substantially free of water-soluble metals, the aforementioned digester 14 or mixer 24 may qualify as the washing stage.

It is to be appreciated that the instant invention is not limited to a method that requires digestion of raw biomass, and the biomass that is used in the method for forming the pyrolysis oil may be free of the fruit component. Under such circumstances, raw biomass 8 may be introduced into the process through the mixer 24 in anticipation of washing the raw biomass 8, with no prior steps performed for purposes of extracting oils, nuts, or other independently useful components from the raw biomass 8. For example, the raw biomass 8 may be stalks from food production, with the raw biomass 8 being subject to washing in the mixer 24. In this embodiment, then, components 12 through 20 would not be present in apparatus 10, and feed 23 would be raw biomass 23 as opposed to fiber 23.

For washing in the mixer 24, wash water 44 is typically mixed with the fiber/biomass 23 in an amount sufficient to completely wet the fiber/biomass 23. Suitable amounts of wash water 44 may be at least about 0.8 parts by volume water to about 1 part by volume of the fiber/biomass 23, such as at least about 1 part by volume water to 1 part by volume of the fiber/biomass 23. While the upper limit for the amount of wash water 44 is not particularly limited, practical limitations such as vessel size may limit the amount of water that is mixed with the biomass. The water/biomass mixture may be heated to promote removal of the water-soluble metal, such as to a temperature of from about 40 to about 80° C., such as from about 50 to about 70° C.

After washing the fiber/biomass 23, a washed fiber/biomass 25 and water 61 containing water-soluble metal are separated. The step of separating the washed fiber/biomass 25 and the water 61 containing the water-soluble metal may involve mechanical separation (e.g., pumping water from the mixer 24 after washing the fiber/biomass 25) to maximize the amount of water-soluble metals that are removed from the fiber/biomass 25. The separated water 61 containing water-soluble metal may be used as the wash water 44/46 described above and, in this regard, may be subject to further processing to remove metals therefrom. For example, the separated water 61 may be passed through a treater 28 such as a reverse osmosis system, adsorbent bed, or ion exchange resin to produce a clean water stream 29 that can be recycled as the wash water 44/46 that is used to wash the biomass. Alternatively, the separated water 61 may be pumped to an evaporation pond, with sludge resulting therefrom being reused as a biomass crop nutrient or otherwise properly disposed of due to the metal content.

The step of separating the washed fiber/biomass 25 and water 61 may also include drying the washed fiber/biomass 25 prior to pyrolyzing, such as through application of heat to the washed fiber/biomass 25 to vaporize at least a portion of water remaining therein. In an embodiment of an apparatus described herein, as shown in FIG. 1, a biomass dryer 27 may be employed for separating the washed fiber/biomass 25 and water 61 containing water-soluble metal after washing the fiber/biomass 23. The water vapor from the biomass dryer 27 may be condensed and reused as the wash water 44/46, or may simply be expelled from the system. At least in the embodiment in which the wash water 44/46 is derived from the condensate of the pyrolysis vapor stream, the presence of water in the washed fiber/biomass 25 that is subject to pyrolysis may not be as much of a concern as in other processes. To explain, the presence of water in biomass during pyrolysis typically results in lower quality pyrolysis oil due to the fact that water separation from pyrolysis oil is difficult and water reduces the energy yield of the pyrolysis oil. Traditional methods of forming pyrolysis oil call for a water content in the biomass that is subject to pyrolysis of less than 6 weight %. However, in the embodiment in which the wash water 44/46 is derived from the condensate of the pyrolysis vapor stream, the washed fiber/biomass 25 may be dried prior to pyrolyzing to a water content of from about 2 to about 10 weight %, such as from about 4 to about 8 weight % or from about 6 to about 10 weight %, based on the total weight of the washed biomass after drying. In this regard, higher amounts of water in the biomass after drying are permissible than what were traditionally deemed acceptable. In one embodiment, such amounts of water in the washed fiber/biomass 65 after drying do not materially affect the quality of the resulting pyrolysis oil due to the fact that most of the water is removed through varying the conditions at which condensate from the pyrolysis vapor stream is condensed to provide a water-rich phase, as described in further detail below. In another embodiment, the wash water 44/46 can be separated from the condensate of the pyrolysis vapor stream without forming a water-rich phase, as also described in further detail below. The lesser need for drying in the instant method also provides reduced energy requirements for drying. In one embodiment, a non-condensable pyrolysis gas 45 from pyrolysis of the biomass, as described in further detail below, may be used as a source of heat for drying the biomass prior to pyrolysis, thus further reducing external energy requirements for drying.

Figure 2:
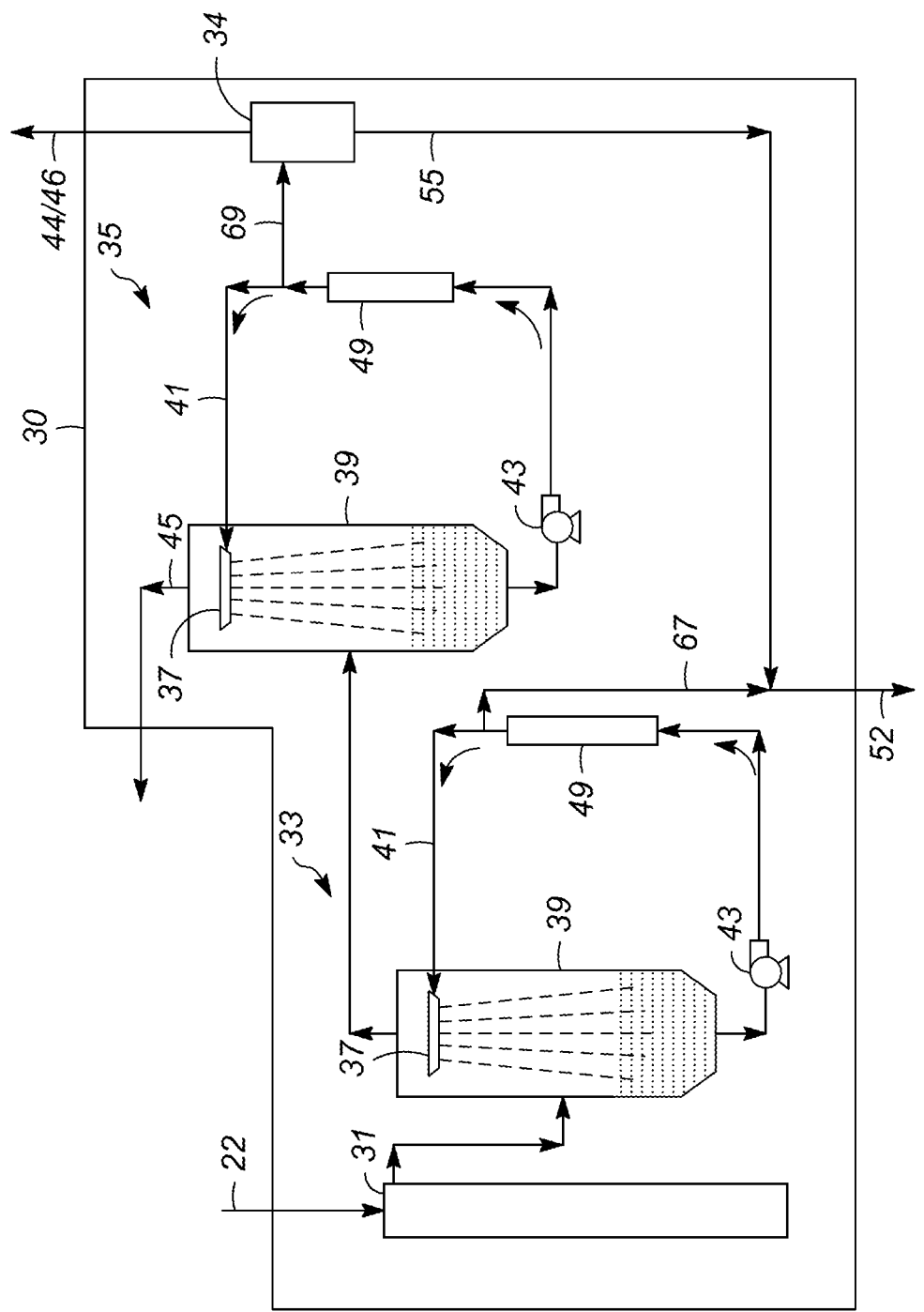
FIG. 2 is a schematic diagram of an exemplary embodiment of a pyrolysis apparatus that may be included in the apparatus for forming the low-metal biomass-derived pyrolysis oil of FIG. 1.

The washed (and optionally dried) fiber/biomass 65 is pyrolyzed in a pyrolysis process to form a pyrolysis vapor stream. As known in the art, pyrolysis is a thermochemical decomposition of organic material at elevated temperatures without the participation of oxygen. In this regard, pyrolysis is typically performed substantially in the absence of molecular oxygen, e.g., in the absence of air, as known in the art. The pyrolysis vapor stream may be obtained by different pyrolysis processes, such as, but not limited to, fast pyrolysis, vacuum pyrolysis, catalytic pyrolysis, and slow pyrolysis (also known as carbonization). In an embodiment, as shown in FIG. 1 and FIG. 2, the steps of pyrolyzing and condensing are performed in a fast pyrolysis apparatus 30. FIG. 2 illustrates the fast pyrolysis apparatus 30 of FIG. 1 in further detail. Fast pyrolysis apparatuses 30 are known in the art and, as shown in FIG. 2, generally include a reactor 31. Although not shown, fast pyrolysis apparatuses 30 also generally include a hot solids recirculation system for reheating pyrolyzing medium, such as sand, and a solids separation mechanism, such as a cyclone, for separating the pyrolysis vapor stream from entrained solids, such as char and the pyrolyzing medium. The char and pyrolyzing medium are returned to the reheater, while a portion of the pyrolysis vapor stream is condensed to form a condensate.

In an embodiment, the step of condensing a portion of the pyrolysis vapor stream is performed in a quenching system as shown in FIG. 2 that comprises a primary condenser 33 and a secondary condenser 35. More specifically, although the entire pyrolysis vapor stream may be condensed, portions of the pyrolysis vapor stream typically remain in gaseous form and are expelled as non-condensable pyrolysis gas 45. The primary condenser 33 and the secondary condenser 35 may each comprise a direct-contact condenser column 39 and a condensate recirculation system 41. The purpose of the condensers 33, 35 is to collect the pyrolysis vapor stream and convert it to a liquid (i.e., condensate). This is accomplished by rapidly cooling the pyrolysis vapor stream from a temperature of over 500° C. to temperatures below about 90° C., such as below about 60° C., depending upon the particular condenser. During operation of the condensers 33, 35, hot pyrolysis vapor stream enters a condenser column where it meets a shower of cool condensate from a shower head 37, which may be a pipe manifold drilled with holes. The condenser column 39 collects condensate in the bottom thereof. The bottom of the condenser column 39 keeps a reservoir of condensate that feeds a recirculation pump 43. The recirculation pump 43 pumps the condensate through a heat exchanger 49, which may be cooled with a coolant such as water, to cool the condensate for reintroduction through the shower head 37. A portion of the cooled condensate is removed during operation of the condensers 33, 35 and collected. Collected condensate from the condensers 33, 35 is mixed to yield a condensate 52 of water and pyrolysis oil from the quenching system.

As set forth above, the wash water 44/46 is derived from the condensate of the pyrolysis vapor stream. "Derived from", for purposes of the instant application, means that the water is obtained from the condensate of the pyrolysis vapor stream, which contains the water. In one embodiment, the wash water 44/46 is separated from the condensate 52 of the pyrolysis vapor stream, e.g., wash water 44/46 may be separated from the biomass-derived pyrolysis oil itself For example, in this embodiment, the wash water 44/46 may be obtained from combined condensate 52 from the primary condenser 33 and the secondary condenser 35 by evaporating and recovering a water phase from the combined condensate 52 at low temperature, such as below 80° C., and at low pressure, such as less than 48 kiloPascals. Without intending to be limiting, a Rotovap or wiped film evaporator may be used for evaporating and recovering the water phase. Evaporation and recovering the water phase from the combined condensate 52 may be useful when a separate water-rich phase is not present in the primary condensate 67 or the secondary condensate 69 or when a pyrolysis oil product with particularly low water content is desired. However, as also set forth above, water may be difficult to separate from the biomass-derived pyrolysis oil. When water is present in a condensate of the pyrolysis vapor stream in an amount of at least 30 weight %, based upon the total weight of the particular condensate, phase separation occurs between a water-rich phase and an oil-rich phase. The water-rich phase can be readily separated from the oil-rich phase, and the separated water-rich phase can provide the wash water 44/46.

In an embodiment, the condensing step comprises forming a water-rich condensate 69 of the pyrolysis vapor stream. The water-rich condensate 69 can be obtained through staged condensation in a primary condensing stage and a secondary condensing stage. For example, the primary condensing stage may involve condensation of a portion of the pyrolysis vapor stream at sufficiently high temperatures and pressures to maintain the water in the vapor phase to yield a primary condensate 67 that is oil-rich, with the secondary condensing stage involving condensation at temperatures and pressures that promote condensation of water, with the secondary condensing stage yielding the water-rich condensate 69 separate from the primary condensate 67. The primary condensing stage and secondary condensing stage can be conducted in the primary condenser 33 and the secondary condenser, respectively. As another example, because quenching systems typically include a primary condenser 33 and a secondary condenser 35 with the resulting condensate from the respective condensers 33, 35 mixed to provide the pyrolysis oil, an additional condenser may also be included to enable more gradual decreasing of temperatures and/or pressures for optimizing the conditions for preferentially condensing pyrolysis vapors in the primary condenser 33 and secondary condenser 35, while optimizing the additional condenser for preferentially condensing water. The additional condenser may be identical in structure and configuration as the primary condenser 33 and the secondary condenser 35, and may be in series with the primary condenser 33 and the secondary condenser 35 with the additional condenser last in the series.

In one specific example, the water-rich condensate 69 has a water concentration of at least 30 weight %, based upon the total weight of the water-rich condensate 69. More specifically, conditions in the primary condensing stage and secondary condensation stage may be controlled to yield the water-rich condensate 69 from the secondary condensing stage. In this embodiment, for example, the primary condenser 33 is operated at a temperature of at least about 40° C., such as from about 40 to about 70° C. or from about 50 to about 60° C., and a pressure of from about 0.01 to about 0.2 Mpa absolute, to yield the primary condensate 67. The aforementioned temperatures and pressures in the primary condenser 33 are higher than normal operating temperatures of primary condensers in pyrolysis apparatuses. Temperatures in the primary condenser 33 are preferably maintained below about 90° C. to avoid polymerization in the primary condensate 67, which comprises an oil-rich phase. Such operating temperatures, at the specified pressures, are sufficient to maintain the water in the vapor phase that exits the primary condenser. In this example, the secondary condenser may be operated at a temperature of from about 30 to about 50° C., such as from about 35 to about 50° C. or from about 30 to about 40° C., at a pressure of from about 0.01 to about 0.2 Mpa absolute, which promotes condensation of the water from the pyrolysis vapor stream. However, as an alternative and as alluded to above, an additional condenser may be included to enable more gradual decreasing of temperatures and/or pressures for optimizing the conditions for preferentially condensing pyrolysis vapors in the primary condenser 33 and secondary condenser 35. When the additional condenser is included, the secondary condenser 35 may be operated at a temperature of from about 50 to about 60° C. as well to maximize the yield of pyrolysis vapor-rich condensate and maintain the water in the vapor phase for subsequent condensing in the additional condenser, with the additional condenser operated at a temperature of from about 30 to about 50° C. The temperature range of from about 30 to about 50° C. in either the secondary condenser 35 or the additional condenser may be sufficient to produce the water-rich condensate having the water concentration of at least 30 weight %, based upon the total weight of the water-rich condensate, such that the water-rich condensate 69 comprises the water-rich phase 44/46 and the oil-rich phase 55 that can be separated in, for example, a separator 34, with the oil-rich phase 55 from the separator 34 mixed with the primary condensate 67 to form the condensate 52 that includes the oil-rich phases from the primary condensate and the secondary condensate (although it is to be appreciated that water will also be present in the condensate 52).

Because the primary condenser 33 typically condenses a majority of the pyrolysis vapor stream, with the secondary condenser 35 or additional condenser condensing a relatively small portion of the pyrolysis vapor stream, high water content of the pyrolysis vapor stream may not dramatically affect the energy yield of the resulting pyrolysis oil due to the fact that most of the water is condensed in the relatively low-yielding secondary condenser 35 or additional condenser. For example, it is not uncommon for the primary condenser 33 to condense about 75 weight % of the pyrolysis vapor stream, with the secondary condenser 35 condensing about 10 weight % of the pyrolysis vapor stream in traditional pyrolysis processes. With the adjusted temperatures and pressures as set forth above, the primary condenser 33 may condense a lesser proportion of the pyrolysis vapor stream, but not significantly less. For example, expected yield from the primary condenser 33 is from about 55 to about 85 weight %, and expected yield from the secondary condenser 35 is from about 10 to about 20 weight %, both based on the total weight of the pyrolysis vapor stream. Remaining portions of the pyrolysis vapor stream can be scrubbed and vented as the non-condensable pyrolysis gas 45, with additional condensate yield of from about 5 to about 15 weight % from the vented non-condensable pyrolysis gas 45 such as through use of a demister and/or filter bed (not shown). Heat from the flue gas possibly being recovered in the biomass drying step by feeding the flue gas stream to the biomass dryer 27, with an exhaust flue gas stream 63 exiting the biomass dryer 27. Thus, the water-rich condensate yielded from the secondary condenser 35 or additional condenser may comprise a proportionally small amount of the total condensate and, once the water-rich phase is separated, the total water content of combined condensate may not be dramatically different from water content achieved in traditionally-prepared pyrolysis oil, even when the biomass has high amounts of water present therein after drying and prior to pyrolysis.

The separated water-rich phase 44/46 from the quenching system may provide the wash water 46 than can be used in digestion within the digester 14 or the wash water 44 that can be used in washing within the mixer 24, for example. In an embodiment, the wash water 44/46 is purified prior to washing the biomass with the wash water 44/46. For example, the separated water-rich phase may be passed through a treater 36 such as a reverse osmosis system, adsorbent bed, or ion exchange resin to produce a clean water stream 71, which then forms at least part of the subsequently-used wash water 44/46. A sludge stream 53 may be expended from the treater 36 and may subsequently be reused as a biomass crop nutrient or otherwise properly disposed of due to the metal content.

The wash water 44/46 may be fed from the quenching system through return lines to the appropriate washing stage for providing water derived from the condensate as the wash water for the biomass.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for forming a biomass-derived pyrolysis oil, the method comprising the steps of:
   washing biomass comprising a water-soluble metal component therein with wash water;
   separating the washed biomass and water containing water-soluble metal after washing the biomass, the washed biomass having a reduced level of metals compared to the biomass before washing;
   pyrolyzing the washed biomass in a pyrolysis process to form a pyrolysis vapor stream; and
   condensing a portion of the pyrolysis vapor stream to form a condensate having a reduced level of metals compared to the biomass before washing;
   wherein at least a portion of the wash water comprises a portion of the condensate.

2. The method of claim 1, wherein the step of condensing comprises forming a water-rich condensate having a water concentration of at least 30 weight %, based upon the total weight of the water-rich condensate.

3. The method of claim 2, wherein the water-rich condensate comprises a water-rich phase and an oil-rich phase, and wherein the water-rich phase is separated from the oil-rich phase.

4. The method of claim 3, wherein the separated water-rich phase comprises the wash water.

5. The method of claim 4, wherein the separated water-rich phase is purified prior to washing the biomass with the wash water.

6. The method of claim 2, wherein the step of condensing comprises a primary condensing stage at a temperature of from about 40 to about 70° C. to yield a primary condensate.

7. The method of claim 6, wherein the step of condensing further comprises a secondary condensing stage at a temperature of from about 30 to about 50° C., and wherein the secondary condensing stage yields the water-rich condensate separate from the primary condensate.

8. The method of claim 1, further comprising digesting the bioass, wherein the step of washing the biomass comprises mixing the wash water and biomass during digestion.

9. The method of claim 1, further comprising:
   digesting the biomass, the digested biomass comprising fiber and optionally nuts; and
   optionally removing the nuts from the fiber:
   wherein the step of washing the biomass occurs after digestion and the optional nut removal step.

10. The method of claim 1, wherein the step of separating the washed biomass and water further comprises drying the washed biomass prior to pyrolyzing to a water content of from about 6 to about 10 weight %, based on the total weight of the washed biomass after drying.

11. A method for forming a biomass-derived pyrolysis oil, the method comprising the steps of:
- washing lignocellulosic biomass with wash water, the lignocellulosic biomass having a water-soluble metal component present in an amount of at least about 0.7 weight % based on the total raw weight of the biomass;
- separating the washed lignocellulosic biomass and water containing water-soluble metal after washing the biomass;
- pyrolyzing the washed lignocellulosic biomass in a pyrolysis process to form a pyrolysis vapor stream; and
- condensing a portion of the pyrolysis vapor stream in a quenching system comprising a primary condenser and a secondary condenser wherein the secondary condenser yields a water-rich condensate having a water concentration of at least 30 weight %, based upon the total weight of the water-rich condensate;
- wherein at least a portion of the wash water comprises a portion of the water-rich condensate of the pyrolysis vapor stream.

12. The method of claim 11, wherein the primary condenser and the secondary condenser each comprise a direct-contact condenser column and a condensate recirculation system.

13. The method of claim 11, wherein the water-rich condensate comprises a water-rich phase and an oil-rich phase, and wherein the water-rich phase is separated from the oil-rich phase.

14. The method of claim 13, wherein the separated water-rich phase comprises the wash water.

15. The method of claim 14, wherein the separated water-rich phase is purified prior to washing the biomass with the wash water.

16. The method of claim 11, wherein the primary condenser is operated at a temperature of from about 40 to about 70° C. and the secondary condenser is operated at a temperature of from about 30 to about 50° C.

17. The method of claim 11, further comprising digesting the biomass, wherein the step of washing the biomass comprises mixing the wash water and biomass during digestion.

18. The method of claim 11, further comprising:
- digesting the biomass, the digested comprising fiber and optionally nuts; and
- optionally removing the nuts from the fiber:
- wherein the step of washing the biomass occurs after digestion and the optional nut removal step.

19. The method of claim 1 wherein the wash water has less than or equal to 500 ppm water-soluble metals.

20. The method of claim 11 wherein the wash water has less than or equal to 500 ppm water-soluble metals.

21. The method of claim 10 wherein the wash water further comprises an acid.

* * * * *